(12) United States Patent
Chan et al.

(10) Patent No.: US 9,324,069 B2
(45) Date of Patent: Apr. 26, 2016

(54) TRANSIT ACCESS APPARATUS AND METHOD INCLUDING DEVICE AUTHENTICATION

(71) Applicant: VISA INTERNATIONAL SERVICE ASSOCIATION, San Francisco, CA (US)

(72) Inventors: William Chi Yuen Chan, Singapore (SG); Kong Boon Ng, Shah Alam (MY)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 14/543,412

(22) Filed: Nov. 17, 2014

(65) Prior Publication Data

US 2015/0073883 A1 Mar. 12, 2015

Related U.S. Application Data

(63) Continuation of application No. 12/817,996, filed on Jun. 17, 2010, now Pat. No. 8,915,431.

(60) Provisional application No. 61/223,349, filed on Jul. 6, 2009.

(51) Int. Cl.
| | |
|---|---|
| *G06Q 20/00* | (2012.01) |
| *G06Q 20/32* | (2012.01) |
| *G06Q 20/20* | (2012.01) |
| *G06Q 20/22* | (2012.01) |
| *G06Q 20/34* | (2012.01) |
| *G06Q 20/40* | (2012.01) |

(Continued)

(52) U.S. Cl.
CPC .............. *G06Q 20/327* (2013.01); *G06Q 20/20* (2013.01); *G06Q 20/22* (2013.01); *G06Q 20/3278* (2013.01); *G06Q 20/352* (2013.01); *G06Q 20/40* (2013.01); *G06Q 20/4016* (2013.01); *G06Q 50/30* (2013.01); *G07B 15/00* (2013.01)

(58) Field of Classification Search
CPC . G06Q 20/40; G06Q 20/4016; G06Q 20/352; G06Q 20/24; G06Q 20/027
See application file for complete search history.

(56) References Cited

U.S. PATENT DOCUMENTS

| | | |
|---|---|---|
| 5,652,786 A | 7/1997 | Rogers |
| 2003/0028814 A1* | 2/2003 | Carta ................. G07C 9/00039 726/21 |

(Continued)

FOREIGN PATENT DOCUMENTS

| | | |
|---|---|---|
| KR | 10-2007-0093530 A | 9/2007 |
| KR | 10-2007-0096699 | 10/2007 |

OTHER PUBLICATIONS

Non-final Office Action dated Nov. 17, 2011, in U.S. Appl. No. 12/817,996, filed Jun. 17, 2010, 14 pages.

(Continued)

*Primary Examiner* — Christopher Stanford
(74) *Attorney, Agent, or Firm* — Kilpatrick Townsend & Stockton LLP

(57) ABSTRACT

An apparatus and method for enabling effective use of a contactless payment device in a transit system. The invention may be implemented in a manner that separates the authentication process from the pre-authorization process, thereby permitting a transit system patron to access and begin use of the transit system prior to authorization of the transaction by the issuer of the device.

21 Claims, 5 Drawing Sheets

(51) Int. Cl.
*G07B 15/00* (2011.01)
*G06Q 50/30* (2012.01)

(56) References Cited

U.S. PATENT DOCUMENTS

| 2006/0278704 A1 | 12/2006 | Saunders et al. |
| 2007/0262139 A1 | 11/2007 | Fiebiger et al. |
| 2008/0156873 A1 | 7/2008 | Wilhelm et al. |
| 2008/0203170 A1 | 8/2008 | Hammad et al. |
| 2011/0000962 A1 | 1/2011 | Chan et al. |

OTHER PUBLICATIONS

Final Office Action dated Apr. 24, 2012, in U.S. Appl. No. 12/817,996, filed Jun. 17, 2010, 16 pages.
Non-final Office Action dated May 16, 2014, in U.S. Appl. No. 12/817,996, filed Jun. 17, 2010, 19 pages.
Notice of Allowance dated Aug. 15, 2014, in U.S. Appl. No. 12/817,996, filed Jun. 17, 2010, 7 pages.
Patent Examination Report No. 1 for Australian National Application 2010270719, dated Jan. 10, 2013, 3 pages.
Notice of Grant for Australian National Application 2010270719, dated Oct. 31, 2013, 3 pages.
International Search Report and Written Opinion mailed Jan. 14, 2011 in International Application No. PCT/US2010/041073, filed Jul. 6, 2010, 9 pages.
Office Action for Canadian National Application No. 2,767,984, dated Dec. 17, 2013, 2 pages.

* cited by examiner

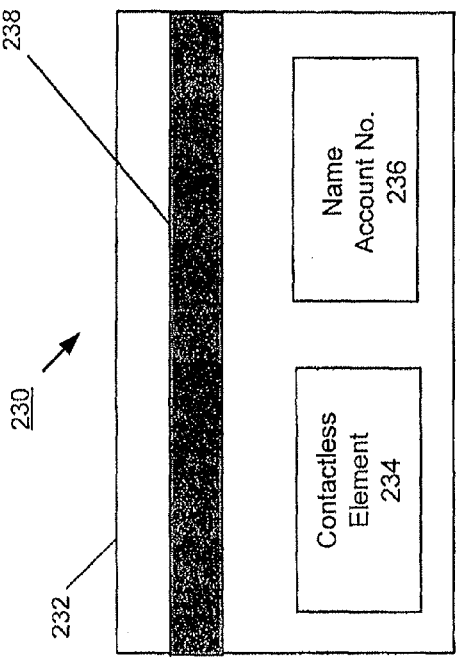
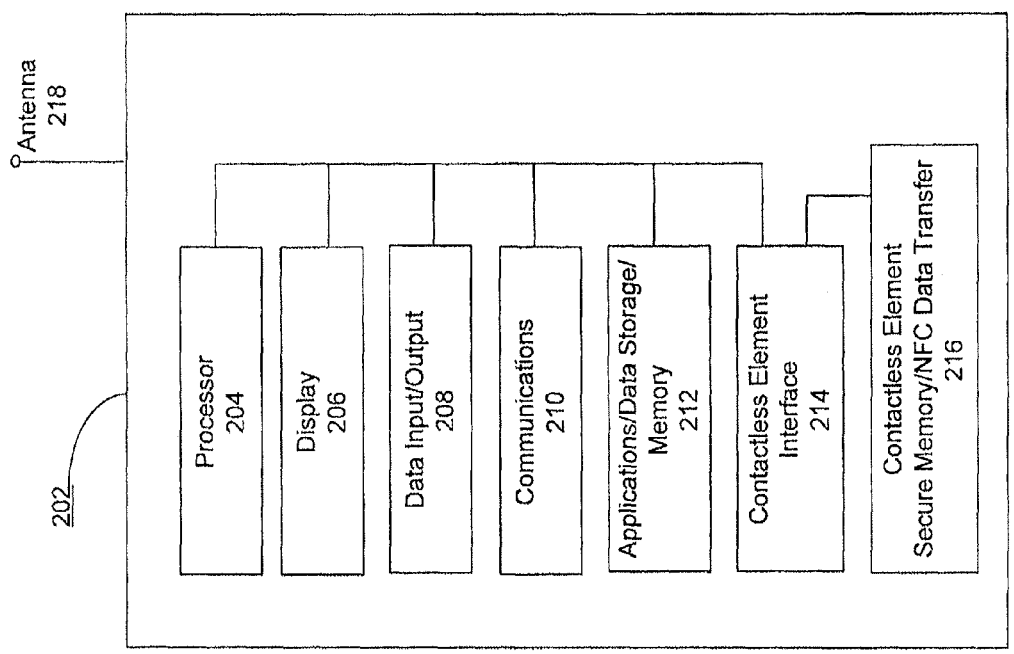

TRANSIT ACCESS APPARATUS AND METHOD INCLUDING DEVICE AUTHENTICATION

CROSS-REFERENCES TO RELATED APPLICATIONS

This application is a continuation of U.S. patent application Ser. No. 12/817,996, filed on Jun. 17, 2010, which claims priority to U.S. Provisional Patent Application No. 61/223,349, filed on Jul. 6, 2009, entitled "TRANSIT ACCESS SYSTEM AND METHOD INCLUDING DEVICE AUTHENTICATION," the complete disclosure of which is incorporated herein by reference for all purposes.

BACKGROUND

Embodiments of the present invention are directed to systems, apparatuses and methods for accessing and paying for use of a transit system, and more specifically, to use of a contactless payment device to access and provide payment for a consumer's use of such a system. Embodiments of the invention may be used to provide access to a transit system and enable a consumer to utilize the system prior to the completion of a transaction pre-authorization process by an issuer of the payment device. Embodiments of the invention may also be used to enable a consumer to access other types of venues or systems in situations where a consumer enters the venue or system and begins using a service, with payment being provided after completion of the use of the service.

Many people make regular use of transit systems to commute to work or to travel for a variety of purposes, where such transit systems include public transit systems such as buses, subways, trains, ferries, and the like. Some form of payment is typically required to use these transportation systems. For example, a consumer may be required to have the exact fare in cash to purchase a ticket or to enter a system. This is inconvenient because a consumer may not always have cash or exact change on hand. Also, it may take time for each user to insert cash into a fare machine or to hand cash to a transit operator, causing lines and delays at each transit stop.

Some transit systems allow a patron to purchase a ticket or pass in advance from a kiosk or cashier. This may eliminate the need for the user to have cash or exact change; however, it still takes time to purchase the ticket or pass in advance and to pass the ticket or pass through a card reader, or to hand the ticket or pass to the transit operator to gain access to the transit system. In addition, different transit system options, such as a bus or subway system, are often managed by different transit agencies. Thus, for some trips, a user must purchase a ticket or pass from one transit agency and then purchase another ticket or pass from a second transit agency. This is inconvenient because the user has to have multiple tickets or passes available, and it is also time consuming for a user to have to stop and buy a ticket at different transfer points to use on a different transit system.

Another means of providing payment for transit fares is to use some form of payment card from which a fare can be deducted from a previously established balance, or to which a fare can be applied as a credit type debt to be paid at a later date. However, as with use of a ticket or pass as described above, such payment cards generally require that the user pass the card through a card reader or other mechanism, or hand the card to a transit system employee. This process is inefficient and inconvenient, as transit system users are often in a hurry and do not want to wait in lines or engage in a formal transaction process that may require time for authentication of the user and approval of the transaction.

The problems encountered in using standard payment card systems has led to an interest in the use of contactless "smart" cards or contactless smart chips as a method of paying for transit fares. A smart card is generally defined as a pocket-sized card (or other portable payment device) that is embedded with either a microprocessor and one or more memory chips, or is embedded with one or more memory chips with non-programmable logic. The microprocessor type card typically can implement certain data processing functions, such as to add, delete, or otherwise manipulate information stored in a memory location on the card. In contrast, the memory chip type card (for example, a pre-paid phone card) can only act as a file to hold data that is manipulated by a reading device to perform a pre-defined operation, such as debiting a charge from a pre-established balance stored in the memory. Smart cards, unlike magnetic stripe cards (such as standard credit cards), can implement a variety of functions and contain a variety of types of information on the card. Therefore, in some applications they do not require access to remote databases for the purpose of user authentication or record keeping at the time of a transaction. A smart chip is a semiconductor device that is capable of performing most, if not all, of the functions of a smart card, but may be embedded in another device.

Smart cards come in two general varieties; the contact type and the contactless type. A contact type smart card is one that includes a physical interface (such as a magnetic stripe or set of contacts) that enables access to the data and functional capabilities of the card, typically via some form of terminal or card reader. A contactless smart card is a smart card that incorporates a means of communicating with the card reader or terminal without the need for direct contact. Thus, such cards may effectively be "swiped" by passing them close to a card reader or terminal. Contactless cards typically communicate with the card reader or terminal using RF (radio-frequency) technology (such as a near field communications technology, RFID, etc.), wherein proximity of the card to a card reader or terminal causes data transfer between the card and the reader or terminal. Contactless cards have found uses in banking and other applications, as they may not require removal from one's wallet or pocket in order to complete a transaction. Further, because of the growing interest in such cards, standards have been developed that govern the operation and interfaces for contactless smart cards, such as the ISO 14443 standard.

Even though contactless smart cards may provide a solution to some of the problems encountered when using standard payment cards in a transit fare payment and collection environment, they do not provide a complete solution. As noted, for a user, the speed of a transaction is an important consideration. A transit patron typically does not want to wait at a transit system entry gate while their payment device (e.g., a contactless card) is authenticated and a pre-authorization is obtained from the device issuer for the expected amount of the transaction. This is an important distinction between a transit system transaction and a payment transaction for a good or service at a merchant location, where typically, a payment device is authenticated, followed by seeking authorization for a transaction amount from the issuer of the device (typically referred to as a pre-authorization). Thus, in a standard payment transaction, a good or service is not made available to the customer until after the payment device has been authenticated and the transaction has been authorized.

Another issue that arises when using a contactless payment device in a transit environment is that a patron's contactless device may not be in communication with a transit system entry terminal for a sufficient amount of time to enable the terminal to read or write transaction related data to the device. This may be required, for example, to enable calculation of fares based on an entry and exit point for the transit (e.g., by writing entry gate data to the device so that upon exit from the system, a fare can be calculated). Also, some contactless devices are not configured to permit data to be written to the device for security, interoperability (or an intentional desire to prevent certain types of interoperability), or other reasons. This means that transit system entry and exit data, and other fare calculation data may not be available for use as part of a transaction pre-authorization process. Further, in some use cases, the amount of the transit fare is not known until the user completes their use of the transit system. These factors mean that the transit fare payment and collection process can not be performed effectively for some contactless devices using a standard authentication and pre-authorization process, as would be used for a purchase transaction at a retail point of sale.

What is desired is a system and associated apparatuses and methods for enabling effective use of a contactless payment card or chip to access and pay for use of a transit system, particularly (although not exclusively) in cases where the card or chip is not configured to permit transit system or fare computation data to be written to it. It is also desired to enable use of contactless payment devices for access to and use of transit and other systems in a manner that is convenient and efficient for users of the system. Embodiments of the invention address these problems and other problems individually and collectively.

SUMMARY

Embodiments of the present invention are directed to a system, apparatus, and method for enabling effective and efficient use of a contactless payment device to access a transit system or other type of venue or system. In some embodiments, the invention is implemented in a manner that separates the authentication process from the pre-authorization process, thereby permitting a transit system patron to access and begin use of the transit system prior to pre-authorization of the transaction by the issuer of the device. This enables a patron to efficiently access a transit system and begin their trip without having to wait until a pre-authorization process has been completed. The invention also permits use of certain legacy contactless devices in transit systems, for example, devices that are not configured to permit data to be written to the device. In addition to transit systems, the invention may be used beneficially with other types of venues or systems, particularly those in which a consumer enters a system and begins using services, with payment being made after exiting the system (e.g., a parking service).

Another aspect of the present invention is that it provides a profitable transaction model for an acquirer, to encourage adoption of contactless devices as a means of providing payment for transit or other services. This can be accomplished by determining an estimated pre-authorization amount for the transit system transaction, where that amount satisfies the business model or requirements of the acquirer. For example, the pre-authorization amount may be determined based on a consideration of the amount that the transit system operator is charged by the acquirer to process a contactless payment card transaction compared to the amount that it costs the acquirer to process the transaction. Further, the pre-authorization amount can be determined after a user has accessed the transit system and begun use of the transit service, with a second authentication of the payment device and calculation of the fare being performed when the user exits the system.

In one embodiment, the present invention is directed to an apparatus for enabling a user to access and utilize a transit system, where the apparatus includes a processor programmed to execute a set of instructions, a data storage medium coupled to the processor, and the set of instructions contained in the data storage medium, wherein when the set of instructions are executed by the processor, the apparatus enables the patron to access and utilize the transit system by authenticating a contactless payment device belonging to the patron presented at a transit system entrance gate, initiating a pre-authorization process for a transit transaction while the patron is in transit using the transit system, wherein the pre-authorization process includes generating a pre-authorization amount for the transaction based on criteria supplied by the payment device acquirer, and authenticating the contactless payment device at an exit gate of the transit system.

In another embodiment, the present invention is directed to a method of enabling a user to access and utilize a transit system, where the method includes determining that a contactless payment device belonging to the patron has been presented at a transit system entrance gate, authenticating the contactless payment device belonging to the patron, initiating a pre-authorization process for a transit transaction while the patron is in transit using the transit system, wherein the pre-authorization process includes generating a pre-authorization amount for the transaction based on criteria supplied by the payment device acquirer, communicating the pre-authorization amount to the issuer of the contactless payment device, and processing the contactless payment device at a transit system exit gate, wherein processing the contactless payment device at the exit gate includes authenticating the contactless payment device and determining a fare for the patron's use of the transit system.

In another embodiment, the present invention is directed to an apparatus for enabling a user to access and utilize a transit system, where the apparatus includes a processor programmed to execute a set of instructions, a data storage medium memory coupled to the processor, and the set of instructions contained in the data storage medium, wherein when the set of instructions are executed by the processor, the apparatus enables the user to access and utilize the transit system by accessing a contactless payment device at a transit system entrance gate, authenticating the contactless payment device, permitting the user to access and utilize the transit system, performing a pre-authorization process for the transit transaction while the user is utilizing the transit system, where the pre-authorization process includes generating a pre-authorization estimate, communicating the pre-authorization estimate to the issuer of the contactless payment device, and processing the payment device at a transit system exit gate, wherein processing the payment device at the exit gate includes authenticating the payment device and determining a fare for the transit system use.

In yet another embodiment, the present invention is directed to a method for enabling a user to access and utilize a transit system, where the method includes accessing a contactless payment device at a transit system entrance gate, authenticating the contactless payment device, permitting the user to access and utilize the transit system, performing a pre-authorization process for the transit transaction while the user is utilizing the transit system, where the pre-authorization process includes generating a pre-authorization estimate, communicating the pre-authorization estimate to the issuer of the contactless payment device, and processing the payment device at a transit system exit gate, wherein processing the payment device at the exit gate includes authenticating the payment device and determining a fare for the transit system use.

Other objects and advantages of the present invention will be apparent to one of ordinary skill in the art upon review of the detailed description of the present invention and the included figures.

BRIEF DESCRIPTION OF THE DRAWINGS

FIG. 2(a) is a functional block diagram illustrating a mobile phone or similar device that includes a contactless payment element and which may be used to provide a user with access to a transit system, in accordance with some embodiments of the present invention;

FIG. 2(b) is a diagram of a payment device in the form of a card that includes a contactless payment element, and that may be used to provide a user with access to a transit system, in accordance with some embodiments of the present invention;

DETAILED DESCRIPTION

Figure 1:
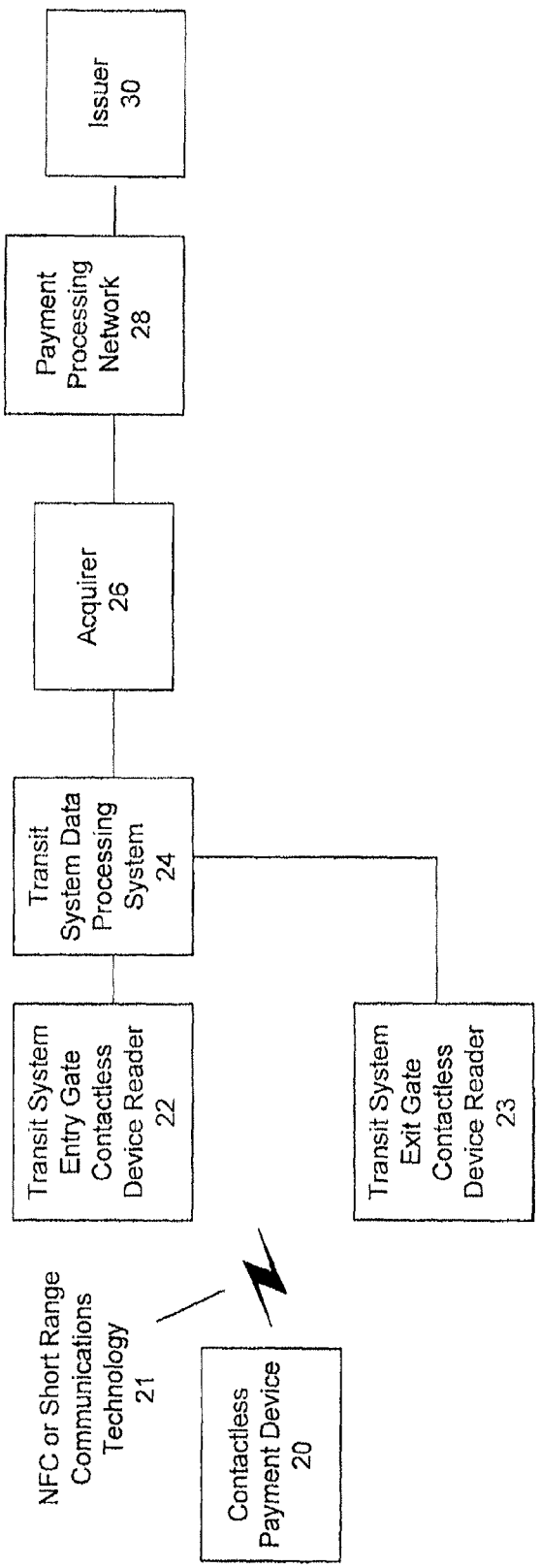
FIG. 1 is a functional block diagram illustrating the primary functional elements of an exemplary system for enabling a user to access and utilize a transit system using a contactless payment device, in accordance with embodiments of the present invention.

FIG. 1 is a functional block diagram illustrating the primary functional elements of an exemplary system for enabling a user to access and utilize a transit system using a contactless payment device, in accordance with embodiments of the present invention. As shown in FIG. 1, in a typical transaction using a contactless payment device to access a transit system, a consumer (i.e., a customer or transit system patron) presents the contactless device 20 to a device reader or terminal 22. Device reader 22 may be part of, or in communication with a transit system gate at the entrance to the system. The transit system gate may include a turnstile or barrier that is permitted to move or is prevented from moving in response to a determination that a consumer is entitled to access, or is to be prevented from accessing the transit system. Contactless payment device 20 may take any suitable form, such as a card, or may be integrated with another device, such as a mobile phone or personal digital assistant (PDA). Contactless payment device 20 and transit system gate device reader 22 may communicate using a near field communications (NFC) technology or similar short range communications method 21. Examples of such NFC technologies or short range communications methods include ISO standard 14443, Bluetooth™, RFID or other radio frequency (RF) technologies, and Infra-red communications methods.

When contactless payment device 20 is "tapped", "swiped", "waved", passed, or otherwise enabled to communicate with transit system entry gate device reader 22, data obtained from device 20 is communicated to transit system data processing system 24, which initiates an authentication process for the device. The authentication process may include determining if the payment device is on a list of stolen or potentially misused devices, if the device is currently registered as valid with the transit system or issuer of the device, etc. This may be accomplished by communication and data exchange with acquirer 26, which is a business entity that manages transactions and account relationships for the transit system. Acquirer 26 may provide data obtained from transit system data processing system 24 to Payment Processing Network 28 as part of the authentication process. Payment Processing Network 28 typically participates in the clearance and settlement processes which are part of the overall processing of a payment transaction. Payment Processing Network 28 may communicate with issuer 30 as part of the authentication process, where issuer 30 is a business entity that issued the payment device to the consumer and manages the consumer's account.

Payment Processing Network 28 may include data processing subsystems, networks, and other means of implementing operations used to support and deliver authorization services, exception file services, and clearing and settlement services for transactions. An exemplary Payment Processing Network may include VisaNet. Payment Processing Networks such as VisaNet are able to process credit card transactions, debit card transactions, and other types of commercial transactions. VisaNet, in particular, includes a VIP system (Visa Integrated Payments system) which processes authorization requests and a Base II system which performs clearing and settlement services.

Payment Processing Network 28 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 28 may use any suitable wired or wireless network, including the Internet, to permit communication and data transfer between network elements. In some cases, payment processing network 28 may include a mobile gateway which acts to couple the Internet to a wireless network and enable the transfer of communications and data between the two types of networks. Among other functions, Payment Processing Network 28 may be responsible, in whole or in part, for ensuring that a consumer is authorized to conduct the transaction (via an authentication process), confirming the identity of a party to a transaction (via receipt of a personal identification number), confirming a sufficient balance or credit line to permit a purchase, generating a transaction risk assessment, or reconciling the amount of a purchase with the consumer's account (via entering a record of the transaction amount, date, etc.).

After using the transit system services, a consumer or patron may exit the system. Upon exiting the transit system at an exit gate, the contactless payment device 20 may communicate with a transit system exit gate contactless reader or terminal 23. The transit system exit gate may include a turnstile or barrier that is permitted to move or is prevented from moving in response to a determination that a consumer is entitled to exit, or is to be prevented from exiting the transit system. As will be described, exit gate reader 23 may perform or cause to be performed a second authentication operation on payment device 20. Further, data obtained when device 20 exits the transit system may be used by transit system data processing system 24 (either alone or in combination with other elements of the payment transaction processing system)

to determine the appropriate fare for the consumer's use of the transit system. Typically, the fare computation will be dependent upon the entry and exit gate locations and a fare schedule implemented by the transit system.

As described, the contactless payment device used to access the transit system may take any of several suitable forms, including a card containing a contactless chip, a smart card, or the payment device may be integrated into another device (e.g., a mobile phone, personal digital assistant (PDA), pager, transponder, portable media player, etc.). The contactless payment device can be a device that incorporates a contactless element such as a chip for storing payment data (e.g., a BIN number, account number, etc.) and a near field communications (NFC) or other short range communications data transfer element such as an antenna, a light emitting diode, a laser, etc. The payment device may also include a keychain device (such as the Speedpass™ commercially available from Exxon-Mobil Corp.), etc. The payment device may incorporate the ability to perform debit functions (e.g., a debit card), credit functions (e.g., a credit card), or stored value functions (e.g., a stored value or pre-paid card).

FIG. 2(a) is a functional block diagram illustrating a mobile phone or similar device that includes a contactless payment element and which may be used to provide a user with access to a transit system, in accordance with some embodiments of the present invention. Note that the mobile phone described with reference to FIG. 2(a) is only an example of a payment device that may be used with embodiments of the invention, and that other devices suitable for use in implementing the invention may include some or all of the functions or elements to be described with reference to the mobile phone depicted in the figure. As illustrated in FIG. 2(a), mobile device 202 may include circuitry that is used to enable certain telephony and other device functions. The functional elements responsible for enabling those functions may include a processor 204 that is programmed to execute instructions that implement the functions and operations of the device. Processor 204 may access data storage 212 (or another suitable memory region or element) to retrieve instructions or data used in executing the instructions. Data input/output elements 208 may be used to enable a user to input data (via a microphone or keyboard, for example) or receive output data (via a speaker, for example). Display 206 may also be used to output data to a user. Communications element 210 may be used to enable data transfer between device 202 and a wireless network (via antenna 218, for example) to assist in enabling telephony and data transfer functions. Device 202 may also include contactless element interface 214 to enable data transfer between contactless element 216 and other elements of the device, where contactless element 216 may include a secure memory and a near field communications data transfer element (or another form of short range communications technology). As noted, a mobile phone or similar device is an example of a portable payment device that may be used to provide access to, and enable use of, a transit system as described with reference to embodiments of the present invention. However, other forms or types of devices may be used without departing from the underlying concepts of the invention. Further, payment devices that are used to provide access to, and enable use of, a transit system may not require the capability to communicate using a cellular network in order to be suitable for use with embodiments of the present invention. For example, as will be described with reference to FIG. 2(b), a smart card that is capable of communicating with the transit system entry and exit gate contactless device readers may be used in some embodiments of the invention, even though such a payment device may not be capable of communicating using a wireless/cellular network.

FIG. 2(b) is a diagram of a payment device 230 in the form of a card that includes a contactless payment element 234, and that may be used to provide a user with access to a transit system, in accordance with some embodiments of the present invention. The payment device depicted in FIG. 2(b) may be a "smart card" or similar device, such as a credit or debit type card in which a chip is embedded. One form of such a device is known as an EMV card. In the context of the present invention, EMV refers to a standard for interoperation of IC cards ("chip cards") and IC card capable point of sale terminals and ATMs, and is used for authenticating credit and debit card payments. The EMV standard defines the interactions at the physical, electrical, data and application levels between IC cards and IC card processing devices for use in financial transactions.

FIG. 2(b) shows a substrate 232 that provides the form factor for device 230. A contactless element 234 for interfacing with a data access or data transfer device may be present on, or embedded within, substrate 232. Contactless element 234 may include a chip or other form of data storage element. Contactless element 234 may include the capability to communicate and transfer data using a near field communications (NFC) technology or other short range communications technology. Consumer information 236 such as an account number, expiration date, and consumer name may be printed or embossed on the card. Although not necessary for operation as a contactless payment device, device 230 may include a magnetic stripe 238 on substrate 232, where magnetic stripe 238 permits access to contactless element 234. This may be used to provide access to data stored in, or the functions of, the chip that is part of the contactless element by a terminal using a magnetic stripe reader.

Figure 3:
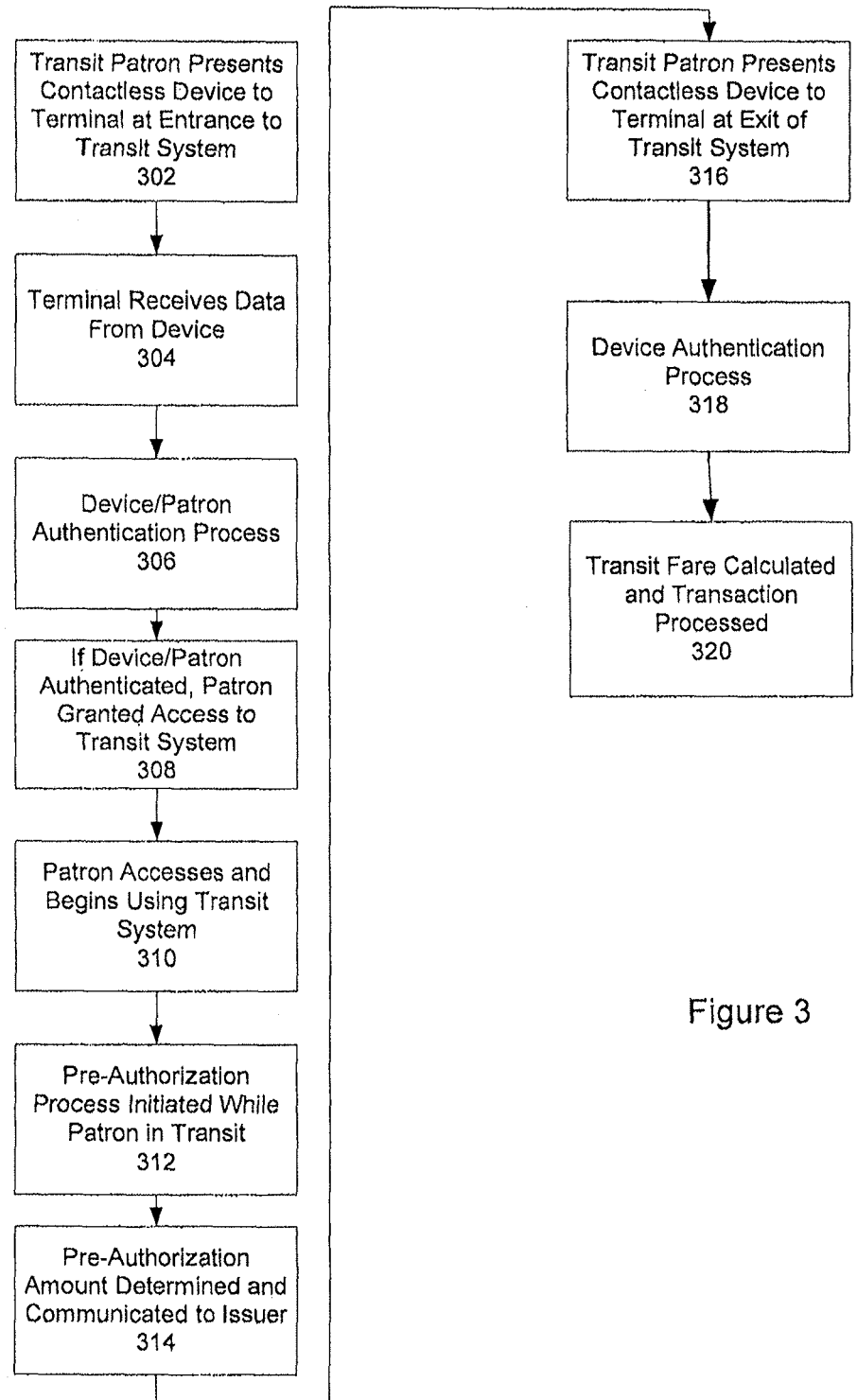
FIG. 3 is a flowchart illustrating a process for using a contactless device to access and use a transit system, in accordance with some embodiments of the present invention.

Given that a consumer is in possession of a suitable payment device (such as the examples shown in FIG. 2(a) or FIG. 2(b)), FIG. 3 is a flowchart illustrating a process 300 for accessing and using a transit system using a contactless device, in accordance with some embodiments of the present invention. As shown in the figure, a consumer (i.e., a user, customer or transit system patron) wishing to patronize a transit system presents a contactless payment device to a device reader or terminal at the entrance to the transit system (stage 302, and as depicted by element 22 of FIG. 1, for example). The payment device may be swiped, waved, passed nearby, momentarily placed in contact with (e.g., tapped against) the device reader, or simply placed in close enough proximity to the device reader to initiate communications and enable data transfer. The device reader or transit gate terminal receives the data transferred from the payment device (stage 304), where the transferred data may include consumer identification or payment account identification data, for example. This initiates a payment device and user/patron authentication process (stage 306). The authentication process will typically include determining that the payment device is a genuine or authentic device. This may involve checking that some characteristic of the device (such as certain data bits) have a desired value or that some form of desired data or identifier is present.

Next, the authentication process will typically involve determining if the payment device is on a "blacklist" (i.e., is not acceptable as a form of payment), if there is an indication that the device has been stolen or previously involved in fraudulent transactions, or if the payment device should be denied acceptance based on criteria developed by the transit system, acquirer, Payment Processing Network, or issuer, for example. Such criteria or reasons for denial of use as a payment device may include, but are not limited to, an ongoing or completed investigation into the circumstances surrounding a previous transaction, a pattern of usage or non-usage of the payment device that may indicate a need to confirm certain consumer or account data, a need to load additional funds onto a prepaid card, etc. The authentication process is typically performed by the issuer of the payment device, but may be performed by, or with the assistance of, other elements of the system described with reference to FIG. 1. For example, the transit system operator may be able to load a data file into the entrance gate or device reader that identifies those payment devices that are blacklisted. This would enable that part of the authentication process to be performed by the gate or device reader instead of by a back end data processing operation.

If the payment device is authenticated as a valid device and is not subject to being blacklisted or otherwise denied use as a payment device, then the transit system patron is provided access to the transit system (stage 308). This may be by means of entry through a gate or other device at a transit station. If the payment device is not authenticated as a valid device or the device is blacklisted, then the transit system patron is denied access to the transit system and may be advised to request assistance in resolving the problem from a representative of the transit system or the issuer. If the consumer/patron is granted access to the transit system, then they begin use of the system, such as by boarding a transit vehicle, for example, a bus, train, trolley, etc. (stage 310).

An aspect of the present invention is that the transit system patron is permitted to access and begin to use the services of the transit system (i.e., board a transit vehicle and begin their trip) prior to the payment transaction being authorized (for example, prior to a preauthorization amount being determined and reserved until settlement of the transaction). This prevents delays at the transit system entry gate, thereby preventing inconvenience to the consumer/patron. In some embodiments, the invention also does not require writing data to the payment device, thereby enabling use of the inventive system, apparatuses and methods with legacy payment devices that are not configured to permit data to be written to the device.

At stage 312, which occurs while the patron is in transit (i.e., using a transit vehicle), a pre-authorization process (sometimes termed a "preauth") is initiated. The pre-authorization process includes determination of a pre-authorization amount for the transaction, with a request for authorization of a transaction for this amount communicated to the issuer (stage 314). The pre-authorization amount is typically reserved or held, and may be deducted from a consumer's credit card account limit or debit card account balance until settlement of the transaction. In some embodiments, the pre-authorization amount may be determined by the transit system operator (e.g., by the transit system data processing system depicted as element 24 in FIG. 1, perhaps in conjunction with an acquirer or taking into account guidelines provided by the acquirer) by one or more suitable methods, and may be dependent upon one or more relevant factors, where such methods and factors may include, but are not limited to:

- Consideration of the type of travel involved (e.g., domestic or cross-border);
- Consideration of the type of consumer/patron involved (e.g., casual, tourist, business, regular, etc.);
- Consideration of the consumer's/patron's previous transit system usage patterns (e.g., amount of transit services used on a specific day or within a specific timeframe, typical transit usage based on type of transit service, location of system entry, etc.);
- Consideration of an amount sufficient to encourage adoption of the inventive process (or at the least, not discourage adoption) by the acquirer, based on consideration of the acquirer processing cost, the transit system operator costs, or other relevant factors; or
- Based on application of one or more criteria, rules, standards, etc. provided by the acquirer in order to satisfy the acquirer's business considerations.

A pre-authorization amount may be generated for a single transit system use or for a set of uses of the system (i.e., multiple trips). In the case of a pre-authorization amount being determined for multiple trips, the pre-authorization amount may be stored in a transit system or issuer database, with an amount for each use of the system being deducted from the stored amount until a reload or recharge of the pre-authorization amount is required. This type of multi-use pre-authorization may be preferred by certain acquirers based on the acquirer's business model; this is because a multi-use authorization may be combined with batch processing of multiple transit payment transactions to reduce the amount of fees that the acquirer may be required to pay for participating in the transactions. By pre-authorizing an amount sufficient to pay for multiple transactions and then submitting those multiple transactions as a group for batch processing, the acquirer may be provided incentives to support the inventive system, since they are not required to pay a data processing fee for each of the multiple transactions. This is but one example of how the pre-authorization amount may be determined in a manner to increase the likelihood of the inventive system and methods being adopted by an acquirer. As noted, among other factors, the transaction pre-authorization amount may depend upon the type of payment device being used, the type of transit (e.g., domestic or cross-border), a characteristic of the patron or the trip the patron is planning to take on the transit system, or a characteristic of the manner in which a payment transaction is processed by the transit system operator, acquirer, issuer, etc. (and the associated costs or resources required).

As an example, in some situations, the transit system operator may incur a transaction cost, that is a cost per transaction that is assessed by an acquirer or issuer against the transit system operator for processing each payment transaction. Similarly, the acquirer may have a processing cost that represents an amount that the acquirer must pay to a payment processing network for the processing of a payment transaction. In such a case, in order for an acquirer to have an incentive to accept payment for transit system usage by means of a payment device, the acquirer processing cost must be less than the operator transaction cost, or less than an amount of the transaction retained by the acquirer for a transaction participated in by a merchant (such as a transit operator). Otherwise, the cost to the acquirer will be greater than the amount received from the transit system operator (or otherwise retained from the transaction), and the acquirer will have a disincentive to accept that form of payment. Further, in some transaction processing systems the acquirer processing cost may include a settlement fee as a part of the cost. The settlement fee may depend upon the amount of the funds set aside for pre-authorization.

As an example, in a typical transaction, the amount for the transaction is deducted by an issuer from an account that the issuer manages for a consumer. This amount is provided to an acquirer (e.g., credited to an account), who then provides payment to the merchant for the transaction (through a credit to an account managed by the acquirer for the merchant). The amount received by the merchant may not correspond to the entire transaction amount, as there may be fees or charges deducted from the transaction amount. In some cases, the acquirer may pay the merchant the transaction amount minus a fee to cover the cost of providing certain transaction services to the merchant. This fee is sometimes termed a merchant discount rate (MDR), and may be computed as a percentage of the transaction amount. The MDR represents a rate or percentage of each transaction charged by an acquirer (e.g., a commercial bank) to a merchant for providing services, such as credit card or debit card services, to the merchant. The MDR typically includes an interchange fee and a payment system fee. The interchange fee is paid to the issuer and is computed as a percentage of the transaction amount. The payment system fee may include a service fee, a license fee, and a data processing fee. Although the fees may vary depending upon certain characteristics of a transaction (such as whether it is a domestic or international transaction), typically the service fee and license fee are based on a percentage of the transaction amount, while the data processing fee is a fixed amount for each transaction.

Based on this model of a transaction and the associated fees, an acquirer's business model (i.e., the amount an acquirer makes from a transaction) may be represented as (where (x) is the amount of the transaction):

$$MDR\ \%(x) - Interchange\ \%(x) - Service\ Fee\ \%(x) - License\ fee\ \%(x) - Data\ Processing\ Fee.$$

As can be seen from the above relationship, the acquirer makes more money from a transaction if the transaction amount is increased. The acquirer also makes more money if the amount of the transaction is relatively larger than the data processing fee (since that is a fixed amount and does not scale with the transaction amount). This is why it may be beneficial in some situations for an acquirer to bundle multiple transactions into a single transaction for purposes of the data processing operations. This would result in a single data processing fee but a larger transaction amount. This may be particularly desirable for the situation in which the amount of each individual transaction is relatively small, so that ordinarily the acquirer may not find it profitable (or sufficiently profitable) to accept such transactions. As recognized by the inventors, one solution to this potential problem is to make the pre-authorization amount larger than the cost of a single transit system use by a consumer. The pre-authorization amount can then be used for multiple transit system uses, with the acquirer only submitting the "transaction" (which is in reality multiple smaller transactions) for settlement and clearance after a consumer has used the transit system a sufficient number of times to make the overall cost of those multiple uses approach the pre-authorization amount. As an example, a pre-authorization amount of $25 (or for example, some multiple of the average transit system single use cost for all customers, a class of customers, commuters, daily users, weekend users, cross-border users, etc.) might be sufficient to satisfy the business requirements of an acquirer while providing convenience for a transit system user. Note that although the transaction model and acquirer business model discussed may be typical of certain types of payment transactions, the present invention may be used with other types of transaction and/or acquirer business models, with the pre-authorization amount being determined based on considerations of those models and the desire to make acceptance of the payment device sufficiently profitable for an acquirer.

At stage 316, the patron completes their use of the transit system vehicle and prepares to exit the system, typically by passing through an exit gate that incorporates a payment device reader or terminal (e.g., element 23 of FIG. 1). The patron again presents their payment device to the exit gate or device reader. As was the case upon entry to the transit system, the exit gate reader or terminal may communicate with the payment device using a near field communications capability or other short range technology, such as RF (e.g., Bluetooth), infrared, or optical communications means. Note that in some embodiments, and depending upon the capabilities of the payment device or the device in which the payment device is embedded, the patron may communicate with the payment device reader or terminal using another suitable method. Such a method may include using the cellular communications network to transmit an "exit" request via a SMS or other messaging service, with that message being communicated to the payment device reader or terminal by a mobile gateway or other infrastructure element.

The exit gate reader or terminal performs an authentication operation on the payment device (stage 318). This is done to ensure that the payment device is still valid (e.g., that is has not been reported stolen or otherwise blacklisted during the transit, or has not been determined to be unreliable or otherwise suspected of being fraudulent). Presentation of the payment device also enables the transit system data processing system to determine the fare for the transit (stage 320). This can be done by associating the account data read from the payment device (such as the account number or other identifying data) with the transit system entry gate where the same account data was previously obtained (and for which no transit fare has yet been calculated). Based on the transit system entry gate for the payment device and the transit system exit gate for the same device, the system can apply the relevant fare schedules, discounts, etc., to obtain the fare for that use of the transit system. After calculating the appropriate fare, the transit system data processing system provides the fare data to one or more of the acquirer, Payment Processing Network, or issuer. This enables the transaction records for the payment account corresponding to the payment device to be reconciled, and for the settlement of the transit transaction. This may include updating or re-setting the pre-authorization amount previously allocated for transit fare transactions for that account or payment device. For example, in some embodiments, the amount authorized may have been intended to cover multiple uses of the transit system so that after each usage an amount is deducted from the pre-authorization amount, with the revised amount then used for the pre-authorization of subsequent transactions.

Note that in some embodiments, the pre-authorization amount may be determined for each use of the transit system, for only certain types of uses of the system, or for only a certain number of uses, value of transit uses, or time elapsed since the previous pre-authorization process. For example, a pre-authorization process may be performed for every use of the transit system for users who are not previously registered with the transit system. Further, a pre-authorization process may be performed to determine a pre-authorization amount for multiple uses of the transit system, with a new pre-authorization process performed only when the previously authorized amount has fallen below some predetermined level.

The inventive system and associated apparatuses and methods permit efficient use of a contactless payment device to access and utilize a transit system. By separating the authentication and pre-authorization processes for a transaction, the invention enables a patron to access and begin using a transit system without encountering the undesirable delay that would typically occur when using a standard transaction pre-authorization process. Further, in some embodiments, the invention does not require writing data to the payment device and is therefore compatible with legacy devices that limit or do not permit data to be written to the device. In addition, the invention enables a transit system (in conjunction with a payment processor or issuer) to offer both pre-paid and post-paid products, where if desired, the products may be targeted at different markets (e.g., the pre-paid for regular domestic users and the post-paid product for cross-border or infrequent users). In some embodiments, a pre-paid product may provide an upfront payment by a consumer that is stored in a data processing system, with the balance adjusted as the consumer uses the transit system. A post-paid product may take the form of a credit card account, with payment being made after the consumer has utilized the transit system and received their credit card account statement.

Figure 4:
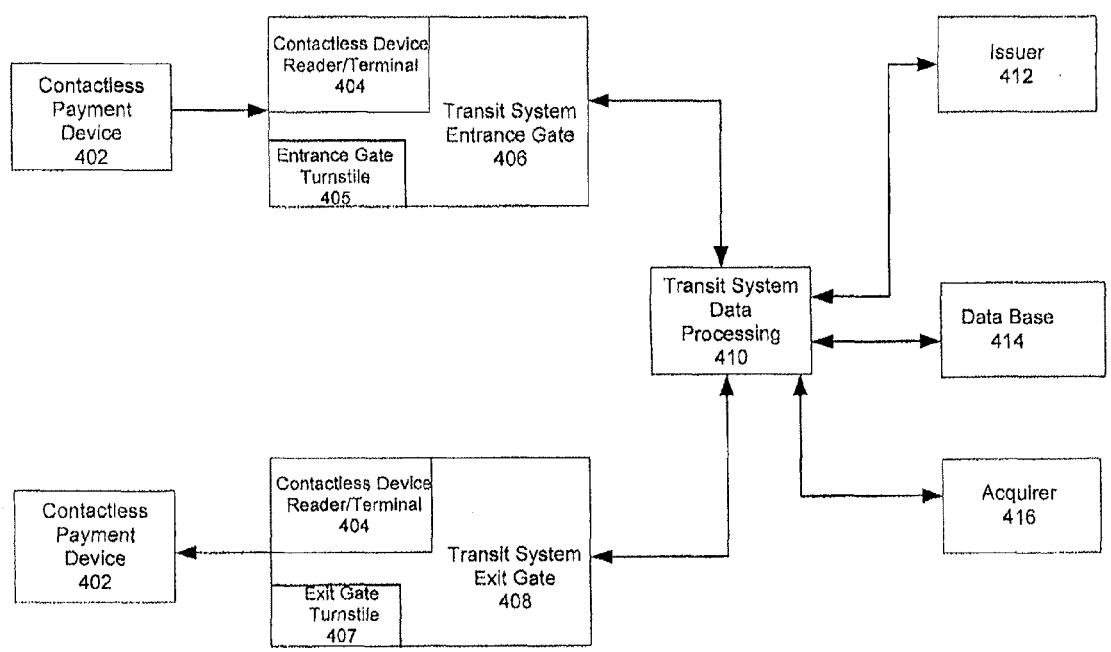
FIG. 4 is a functional block diagram illustrating the elements of a system architecture for enabling a user to access a transit system using a contactless device, in accordance with some embodiments of the present invention.

FIG. 4 is a functional block diagram illustrating the elements of a system architecture 400 for enabling a user to access a transit system using a contactless payment device, in accordance with some embodiments of the present invention. The inventive system and methods may be used with any suitable form of contactless payment device (e.g., an EMV compliant device, where as noted, EMV refers to a specific interoperability standard for certain payment devices and terminals), and it is understood that use of the system with EMV cards or other types of contactless payment devices is contemplated and within the scope of the invention.

As shown in the figure, a contactless payment device 402 (e.g., an EMV compliant contactless card or other suitable form of payment device, such as those depicted in FIGS. 2(*a*) and 2(*b*)) is presented to a contactless payment device reader or terminal 404 at an entrance to the transit system. Contactless payment device reader or terminal 404 is incorporated into, or in communication with, transit system entrance gate 406 to enable transit system gate 406 to accept contactless payment devices for payment of transit services and access to the transit system. Transit system entrance gate 406 may include a turnstile or barrier 405 that is permitted to move or is prevented from moving in response to a determination that a consumer is entitled to access, or is to be prevented from accessing the transit system.

For example, in some embodiments, entrance gate 406 may comprise a processor, a computer readable medium, a portable consumer device reader 404, a gate device such as a turnstile, a barrier, a gate, etc. 405, an output device, and a network interface, all operatively coupled to the processor. A housing may house one or more of these components. Exemplary portable consumer device readers 404 can include RF (radio frequency) antennas, magnetic stripe readers, etc. that interact with a portable consumer device. Suitable output devices may include displays and audio output devices. Exemplary computer readable media may include one or more memory chips, disk drives, etc. In some embodiments, an output device could also be caused to operate by an appropriate gate device, if the gate device actuates to cause the output device to provide a message indicating that the user is authorized to proceed. The computer readable medium may store code or instructions for allowing gate access device to operate in the manner described herein. The instructions may be executed by the processor. The network interface may allow the gate access device to send and receive messages from other components of the data processing system involved in the authentication, pre-authorization, and gate access functions.

Contactless payment device reader or terminal 404 performs the authentication process that is required by the transit system, payment device issuer, or other relevant entity to enable the consumer/patron to enter the transit system using a contactless device. This authentication process may include, but is not limited to, or required to include, verifying that the payment device is not blacklisted or otherwise indicated as invalid (e.g., suspected of being fraudulent, expired, or otherwise unacceptable as a method of accessing the transit system). Upon determining that payment device 402 is valid, the possessor of the device is permitted to enter the transit system, and begin their travel. If the payment device 402 should be determined to be blacklisted or otherwise invalid, then the user of the payment device may be referred to a transit system service representative for assistance in determining the reason why the user was denied entry to the transit system.

Upon authentication of payment device 402 (which may occur within the entry gate or with the assistance of other data processing entities), transit system entrance gate 406 communicates with the transit system data processing system 410 to inform the data processing system that an authenticated payment device having a specified identification or account number has entered the transit system. This information will be used by the transit system to calculate the fare for the patron's travel (upon receipt of data obtained form the transit system exit gate accessed by the patron), and also initiates the pre-authorization process for the transit system transaction. The pre-authorization process involves providing the payment device issuer 412 with a pre-authorization amount for the transaction, and as noted, the pre-authorization process occurs while the patron is in transit and using the transit system services.

The transit system data processing system 410 determines the pre-authorization amount for the transaction and communicates this amount to the issuer 412. As described, the pre-authorization amount may be calculated by one or more suitable methods or processes, and will typically be a business decision based on (or taking into account) satisfaction of the business model or criteria of the acquirer 416. The method or process used to determine the pre-authorization amount may be based on any suitable criteria, rules, or heuristics, including, but not limited to, transit usage patterns of the payment device user, the payment account history of the user, a desire to provide the proper incentives for an acquirer to accept contactless payment devices as payment for transit services within the transit system, etc. Determination of the pre-authorization amount may involve communication with the acquirer 416 to determine appropriate guidelines, criteria, or rules, although such communication is not required. The entry gate location, payment device account data, and the determined pre-authorization amount may be stored as part of a transaction record in the transit system database 414. The stored data may be used to settle the transaction when the patron exits the transit system and the fare is calculated for that particular use of the transit system.

Upon arriving at their destination, the transit patron (the payment device user) exits the transit system. The system is exited using a transit system exit fare gate or terminal 408 at the exit location, in a similar manner as was used to enter the system. Transit system exit gate 408 may include a turnstile or barrier 407 that is permitted to move or is prevented from moving in response to a determination that a consumer is entitled to exit, or is to be prevented from exiting the transit system. Transit system exit gate 408 may include the same or similar components to those described with reference to the entrance gate 406. Similarly to the entrance gate, exit gate 408 may include a contactless payment device reader or terminal 404 (which, as was the case for the entrance gate, may be incorporated into or in communication with the transit system exit gate). Contactless payment device reader or terminal 404 performs a second authentication process, as may be required by the transit system, payment device issuer, or other relevant entity. As noted, this is done to ensure that contactless payment device 402 is still valid (and has not been reported stolen, blacklisted, or otherwise determined to be invalid or unacceptable during the transit). The second authentication process also enables the transit system data processing system 410 to determine the fare for the transit by providing the patron's exit location to the data processing system. Based on the patron's entry and exit gate locations, transit system data processing system 410 is able to calculate the proper fare for the transit, using the fare schedules, discounts, etc., that are applicable to the situation.

Note that among other functions or capabilities, the contactless payment device reader or terminal (either alone or in combination with other elements of the system depicted in FIG. 1 or 4) may perform data processing operations that are specific to the type of payment device being used. For example, a different authentication process may be used depending upon the type of payment device being used, thereby enabling acceptance of multiple types of payment devices (such as smart cards issued by multiple issuers) as payment for transit services. As one example, legacy smart cards may require a different authentication process than newer versions or types of such cards. This may be the result of the capabilities of the different types of payment devices (e.g., that certain devices are capable of having data written to them, while others are not) or the use of different protocols for processing transactions involving the different types of payment devices. By recognizing different types of payment devices (based on the presence or lack of certain flags or data) and applying the relevant processing protocols, the transit system may be able to track which types of contactless payment devices are used, how each type is used, etc.

Although the present invention has been described as being applicable to a patron's access and use of a transit system, it may also be used to enable a consumer to access and use other services. For example, the present invention may be used to enable a consumer to access and begin using a parking or other service where a user enters a location but the actual amount of the transaction is not determined until completion of the service.

Figure 5:
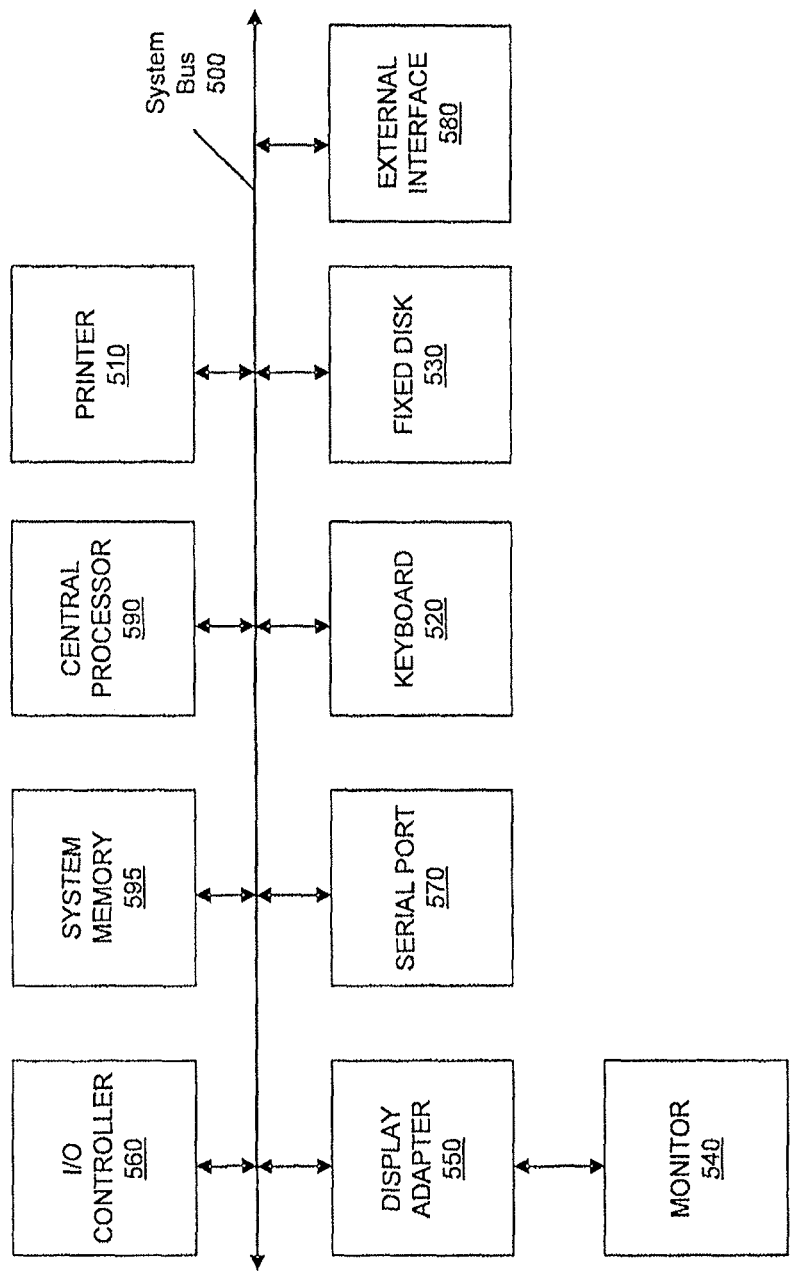
FIG. 5 is a block diagram of elements that may be present in a computing device or system programmed to implement a method or process for enabling a user to access and use a transit system, in accordance with some embodiments of the invention.

In some embodiments, the inventive methods, processes or operations for enabling a consumer to access and use a transit system may be wholly or partially implemented in the form of a set of instructions executed by a programmed central processing unit (CPU) or microprocessor. The CPU or microprocessor may be incorporated in an apparatus (such as a transit system device reader or gate, or transit system data processing element), server or other computing device operated by, or in communication with, a node of the transit system or payment transaction processing network. As an example, FIG. 5 is a block diagram of elements that may be present in a computing device or system programmed to implement a method or process for enabling a user to access and use a transit system, in accordance with some embodiments of the invention. The subsystems shown in FIG. 5 are interconnected via a system bus 500. Additional subsystems such as a printer 510, a keyboard 520, a fixed disk 530, a monitor 540, which is coupled to a display adapter 550, and others are shown. Peripherals and input/output (I/O) devices, which couple to an I/O controller 560, can be connected to the computer system by any number of means known in the art, such as a serial port 570. For example, the serial port 570 or an external interface 580 can be used to connect the computer apparatus to a wide area network such as the Internet, a mouse input device, or a scanner. The interconnection via the system bus 500 allows a central processor 590 to communicate with each subsystem and to control the execution of instructions that may be stored in a system memory 595 or the fixed disk 530, as well as the exchange of information between subsystems. The system memory 595 and/or the fixed disk 530 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. An apparatus for enabling a patron to access and utilize a transit system, comprising:
   a processor programmed to execute a set of instructions;
   a data storage medium coupled to the processor; and
   the set of instructions contained in the data storage medium, wherein when the set of instructions are executed by the processor, the apparatus enables the patron to access and utilize the transit system by
   receiving entry data in response to authenticating a payment device belonging to the patron presented at an entrance gate of the transit system at the start of a trip conducted by the patron, wherein the patron is able to enter and begin use of the transit system prior to initiating a pre-authorization process for a payment transaction based on the patron's use of the transit system;
   initiating the pre-authorization process for the payment transaction while the patron is using the transit system and is on the trip, wherein the pre-authorization process includes generating a pre-authorization amount for the payment transaction, wherein the pre-authorization process comprises a request for authorization for the transaction for the pre-authorization amount which is reserved from an account balance of an account associated with the payment device until settlement of the payment transaction; and
   receiving exit data in response to authenticating the payment device at an exit gate of the transit system at the end of the trip, wherein the authenticating the payment device belonging to the patron presented at the transit system entrance gate and the authenticating the payment device at the exit gate of the transit system ensures that the payment device has not become invalid during the patron's use of the transit system.

2. The apparatus of claim 1, wherein the set of instructions further include instructions which when executed by the processor cause the apparatus to determine a fare for the patron's use of the transit system after the payment device is authenticated at the exit gate of the transit system.

3. The apparatus of claim 1, wherein the pre-authorization amount is based at least in part on a fee charged by an acquirer to the transit system to process a transaction using the payment device and a fee charged by a payment processor to the acquirer to process a transaction using the payment device.

4. The apparatus of claim 1, wherein authenticating the payment device belonging to the patron presented at the entrance gate of the transit system further comprises determining that the payment device belonging to the patron is a valid payment device.

5. The apparatus of claim 4, wherein determining that the payment device belonging to the patron is a valid payment device further comprises determining that the payment device is not excluded from being used as a payment device.

6. The apparatus of claim 1, wherein authenticating the payment device at the exit gate of the transit system further comprises determining that the payment device is a valid payment device.

7. The apparatus of claim 6, wherein determining that the payment device is a valid payment device further comprises determining that the payment device is not excluded from being used as a payment device.

8. The apparatus of claim 1, wherein the payment device is a mobile phone, PDA, portable computing device, or a smart card.

9. The apparatus of claim 8, wherein the payment device is the mobile phone.

10. The apparatus of claim 1, wherein authenticating the payment device belonging to the patron further comprises determining that the payment device has not been excluded from being used as a payment device while the patron is using the transit system.

11. A method comprising:
receiving entry data in response to authenticating a payment device belonging to a patron presented at an entrance gate of a transit system at the start of a trip conducted by the patron, wherein the patron is able to enter and begin use of the transit system prior to initiating a pre-authorization process for a payment transaction based on the patron's use of the transit system;
initiating the pre-authorization process for the payment transaction while the patron is using the transit system and is on the trip, wherein the pre-authorization process includes generating a pre-authorization amount for the payment transaction, wherein the pre-authorization process comprises a request for authorization for the transaction for the pre-authorization amount which is reserved from an account balance of an account associated with the payment device until settlement of the payment transaction; and
receiving exit data in response to authenticating the payment device at an exit gate of the transit system at the end of the trip, wherein the authenticating the payment device belonging to the patron presented at the transit system entrance gate and the authenticating the payment device at the exit gate of the transit system ensures that the payment device has not become invalid during the patron's use of the transit system.

12. The method of claim 11, wherein the pre-authorization amount is based at least in part on a fee charged by an acquirer to the transit system to process a transaction using the payment device and a fee charged by a payment processor to the acquirer to process a transaction using the payment device.

13. The method of claim 11, wherein authenticating the payment device belonging to the patron presented at the entrance gate of the transit system further comprises determining that the payment device belonging to the patron is a valid payment device.

14. The method of claim 13, wherein determining that the payment device belonging to the patron is a valid payment device further comprises determining that the payment device is not excluded from being used as a payment device.

15. The method of claim 14, wherein enabling the patron to enter and begin use of the transit system prior to initiating the pre-authorization process further comprises operating a turnstile coupled to the entrance gate of the transit system to permit the patron to enter the transit system in response to determining that the payment device is not excluded from being used as a valid payment device.

16. The method of claim 11, wherein authenticating the payment device at the exit gate of the transit system further comprises determining that the payment device is a valid payment device.

17. The method of claim 16, wherein determining that the payment device is a valid payment device further comprises determining that the payment device is not excluded from being used as a payment device.

18. The method of claim 17, further comprising operating a turnstile coupled to the exit gate of the transit system to permit the patron to exit the transit system in response to determining that the payment device is not excluded from being used as a payment device.

19. The method of claim 11, wherein the payment device is a mobile phone, PDA, portable computing device, or a smart card.

20. The method of claim 19, wherein the payment device is the mobile phone.

21. The method of claim 11, wherein authenticating the payment device belonging to the patron further comprises determining that the payment device has not been excluded from being used as a payment device while the patron is using the transit system.

* * * * *